No. 688,251. Patented Dec. 3, 1901.
H. P. & H. S. JONES.
GROOVE CUTTING MACHINE.
(Application filed June 25, 1900.)
(No Model.) 3 Sheets—Sheet 1.

Witnesses:
Chas. E. Gaylord
John Enders

Inventors:
Harvey P. Jones,
Harry S. Jones.

No. 688,251. Patented Dec. 3, 1901.
H. P. & H. S. JONES.
GROOVE CUTTING MACHINE.
(Application filed June 25, 1900.)

(No Model.) 3 Sheets—Sheet 2.

Witnesses:
Inventors:
Harvey P. Jones,
Harry S. Jones.

No. 688,251. Patented Dec. 3, 1901.
H. P. & H. S. JONES.
GROOVE CUTTING MACHINE.
(Application filed June 25, 1900.)
(No Model.) 3 Sheets—Sheet 3.
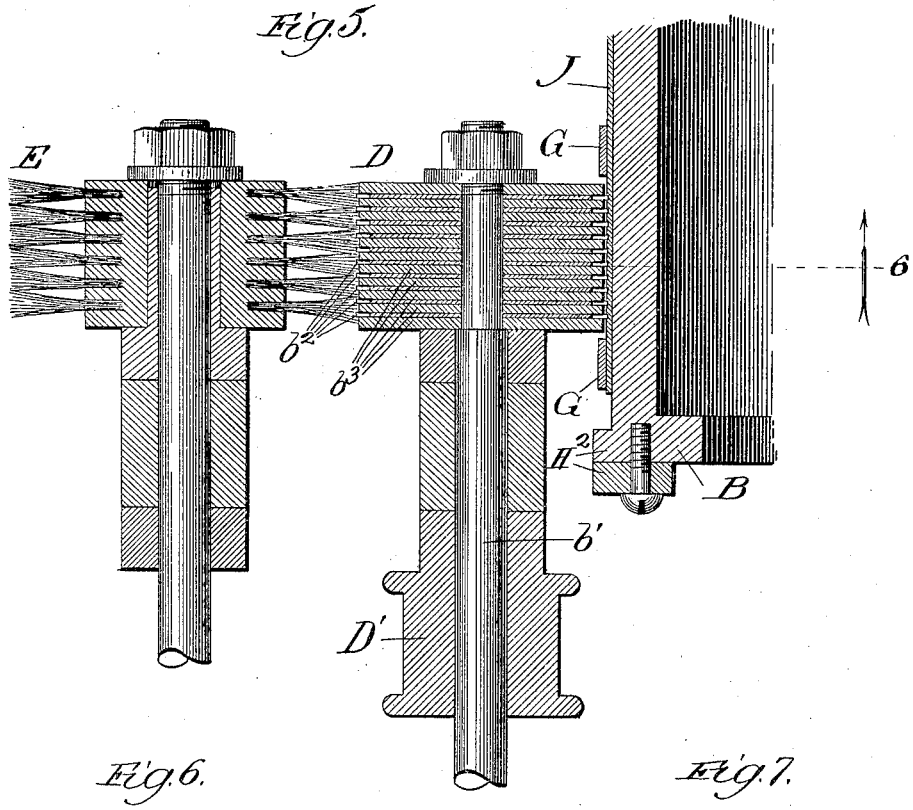
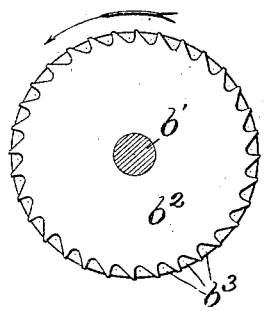
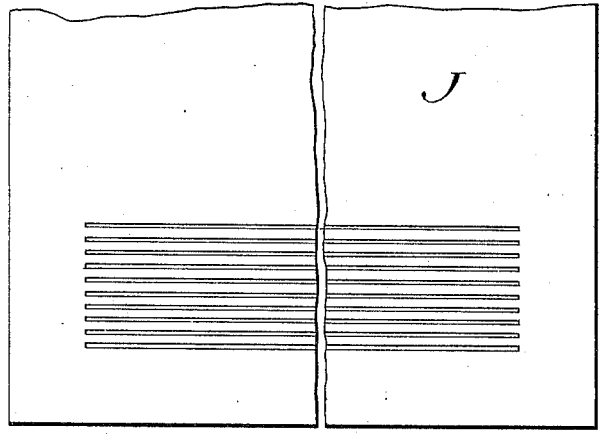
Witnesses:
Inventors:
Harvey P. Jones,
Harry S. Jones,

UNITED STATES PATENT OFFICE.

HARVEY P. JONES AND HARRY S. JONES, OF CHICAGO, ILLINOIS.

GROOVE-CUTTING MACHINE.

SPECIFICATION forming part of Letters Patent No. 688,251, dated December 3, 1901.

Application filed June 25, 1900. Serial No. 21,498. (No model.)

*To all whom it may concern:*

Be it known that we, HARVEY P. JONES and HARRY S. JONES, citizens of the United States, residing at Chicago, in the county of Cook and State of Illinois, have invented a new and useful Improvement in Groove-Cutting Machines, of which the following is a specification.

Our invention relates particularly to machines for cutting grooves in ledger-leaves; and our primary object is to provide a machine of high capacity capable of cutting or removing the sizing from leaves on lines parallel to the binding edge to produce a weakened area of bending, the sheet being left imperforate at said area and upper and lower margins being left intact to prevent tearing.

Figure 1:
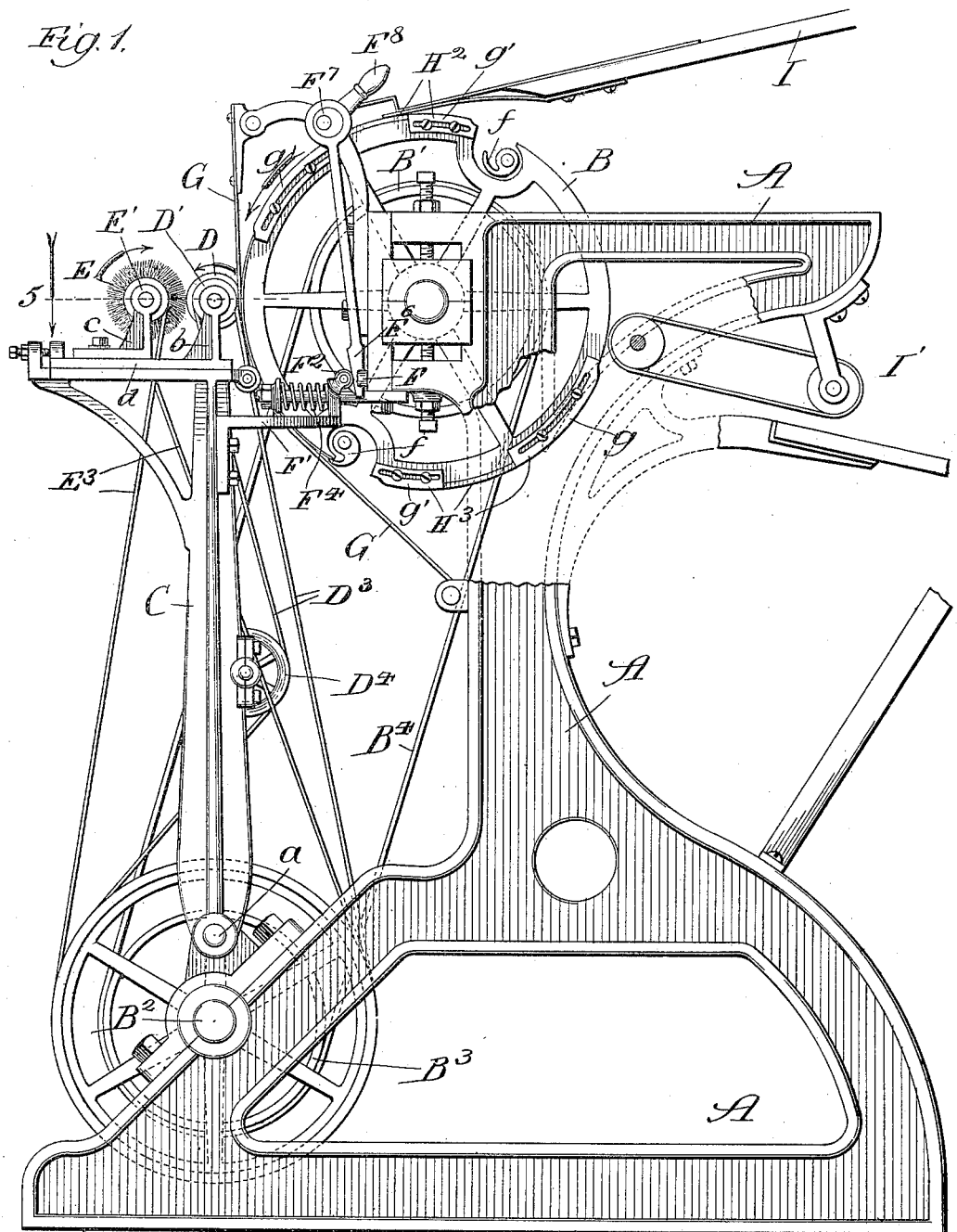
Figure 2:
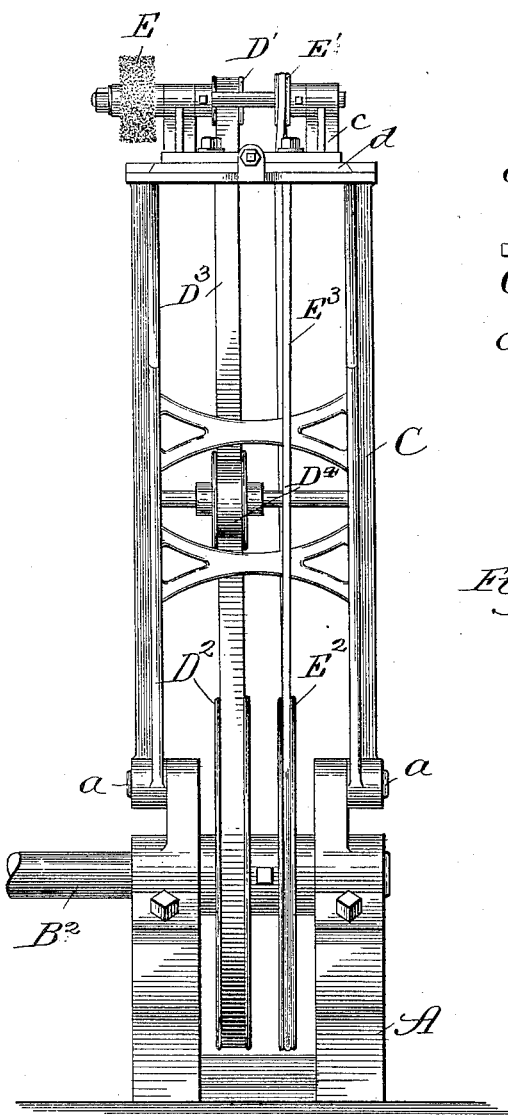
Figure 3:
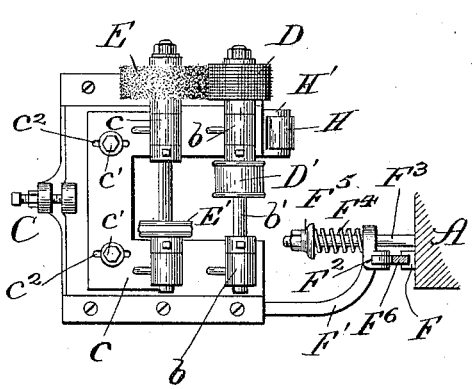
Figure 4:
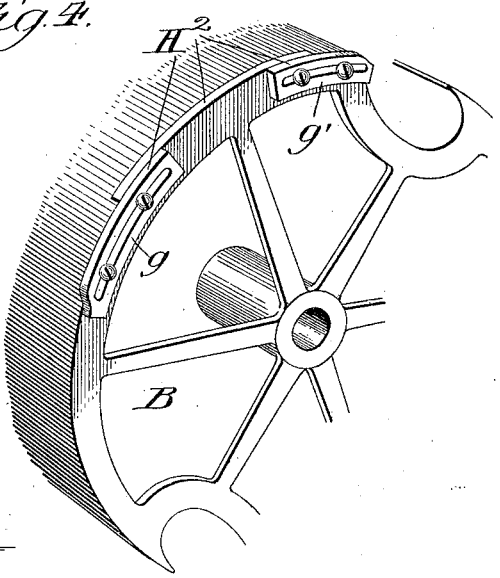

In the accompanying drawings, Figure 1 is a broken view, in side elevation, of a machine embodying our invention; Fig. 2, a view in elevation of the yieldingly-held cutting-head frame; Fig. 3, a plan view of the same; Fig. 4, a broken perspective view of the rotary stock-cylinder or planing-bed employed; Fig. 5, an enlarged broken section at line 5 of Fig. 1, showing the stock-cylinder in a different position, however, than in Fig. 1; Fig. 6, a section through the cutter-head at line 6 of Fig. 5; and Fig. 7, a fragmentary view of a ledger-leaf, showing the grooves produced by the machine.

The machine shown is adapted to receive two leaves at each revolution of the stock-cylinder. The cutting-head is brought into contact with each leaf just after the advance lateral margin thereof has passed beneath it and is lifted from the leaf when the rear lateral margin is reached.

A represents the main frame of the machine; B, the stock-cylinder or rotary planing-bed; B', a driving-pulley for the cylinder B; B², the main driving-shaft; B³, a pulley for communicating motion to the pulley B' through the medium of a belt B⁴; C, the cutting-head frame pivotally connected to the main frame at points $a$; D, the cutting-head; D', D², and D³, pulleys and a belt for communicating motion from the main shaft to the cutting-head; D⁴, an idler for the belt D³; E, a rotary brush contacting with the cutting-head D and rotating in an opposite direction; E', E², and E³, pulleys and a belt for communicating motion from the main shaft to said brush; F, Figs. 1 and 3, a grooved lug on the main frame; F', a bracket or projection carried by the frame C; F², a roller journaled in the end thereof; F³, a stud projecting from the frame A and extending through a perforation in the bracket F'; F⁴, a spring confined between the bracket F' and a tension-adjusting nut F⁵ on the end of said stud; F⁶, a sliding cam movable in the slot of the lug F and contacting with the roller F²; F⁷, an eccentric supported from the main frame and serving to move the cam F⁶; F⁸, a handle for operating said eccentric; G, bands such as are commonly employed on printing-machines for holding the sheets of paper in contact with the cylinder B, and H, Fig. 3, a roller journaled in a bracket H' at the upper end of the frame C and adapted to be engaged by cams H² and H³ on the cylinder B.

The cutting-head and brush are shown supported on brackets $b$ and $c$, respectively, carried by an adjustable slide $d$. The bracket $c$ is itself adjustable on the slide $d$ by means of bolts $c'$, projecting through slots $c^2$. The cutting-head is carried by a shaft $b'$ and comprises a plurality of cutters $b^2$ and spacing and gage disks $b^3$.

The cylinder B is shown provided with nippers $f$ of the kind now commonly employed in certain types of printing-presses. The commonly-employed feed-board I and endless delivery-belt I' are also shown.

The cam H² has adjustable end portions $g$ $g'$, and the cam H³ has similar adjustable portions. This makes each cam adjustable in length and, in effect, adjustable in position relative to the cylinder B.

The leaves are fed to and clamped upon the cylinder B just as sheets of paper are fed to certain well-known printing-presses. The leaves are disposed with their binding edges extending circumferentially, whereby the grooves are cut parallel to the binding edges. As the cylinder B rotates, the leaves (represented by J) are carried thereby beneath the cutting-head. The frame C being under tension, the cutting-head presses upon the leaves, except when the cams H² and H³ engage the roller H and rock said frame from the main frame and hold it away from the same. Thus in Fig. 1 the cam H³ properly should have passed from beneath the roller just after the advance lateral margin of the leaf passed from beneath the cutter-head. The cutting-head should then remain in contact with the leaf till the roller is engaged by the advance end of the cam $H^2$, which should occur in time to preserve a rear lateral margin intact. Similarly the rear end of the cam $H^2$ passes from beneath the roller just as the advance margin of the succeeding leaf emerges from the cutter, and the cutter continues in contact till the advance end of the cam $H^3$ contacts with the roller H.

It will be noted that the adjacent surfaces of the cutting-head and stock-cylinder move in opposite directions, whereas the adjacent surfaces of the cutting-head and brush move in the same direction. The dust is discharged through a suitable chute. (Not shown.) When desired, the cam or wedge $F^6$ may be manually operated to force the cutter-head frame from the main frame.

In the delicate operation of cutting glazing from paper it is of great importance that the depth of grooves be carefully gaged, and this is best accomplished by locating the gage upon the cutting-head.

It is considered within the scope of our invention to replace the toothed cutters shown by any suitable cutters. Likewise the manner of connecting the cutting-head frame to the main frame may be variously modified without departure from our invention. The machine may be applied to purposes similar to the purpose described. In the preferred construction the cutting-head is equipped with groove-cutting saw-teeth, which actually sever and remove the glazing on one side the sheet of paper, thereby producing grooves of substantial width.

What we claim as new, and desire to secure by Letters Patent, is—

1. In a machine of the character described, the combination of a moving bed to which the stock is secured, and a rotating cutting-head having its surface at the point of cutting moving in a direction opposite the direction of movement of said bed during the cutting operation and comprising properly-spaced saw-toothed groove-cutters and a circular gage for bearing upon the stock and regulating the depth of cut, said cutting-head having a greater surface speed than said bed, substantially as and for the purpose set forth.

2. The combination of a rotating stock-cylinder for receiving sheet material, a rotating cutting-head equipped with groove-cutting teeth, yielding connection between said two members, and a cam for moving one rotating member away from the other to permit the lateral margins of the sheet to pass intact beneath the cutter, substantially as and for the purpose set forth.

3. The combination of a main frame, a stock-cylinder journaled therein for receiving sheet material, a cutting-head frame, a rotary cutting-head journaled therein and provided with groove-cutting teeth, and a cam on said stock-cylinder for moving said cutting-head frame, substantially as and for the purpose set forth.

4. In a machine of the character described, the combination of a bed to which the stock is secured, a rotary cutting-head comprising circular saw-toothed groove-cutters and separating gage-disks, means for forcing said cutting-head against the stock carried by said bed till the stock is engaged by said gage-disks, and means for automatically moving the cutting-head away from the stock to permit margins to pass intact, substantially as and for the purpose set forth.

5. The combination of a main frame, a stock-cylinder journaled therein, a cutting-head frame, a cutting-head journaled therein, means for rotating the cylinder and cutting-head in the same direction, and means for automatically moving said cutting-head into contact with the stock on said cylinder, maintaining it there for a time, and then removing it from contact, substantially as and for the purpose set forth.

6. The combination of a main frame, a rotating stock-cylinder, a cutting-head frame movably connected with the main frame, yielding connection between said frames, a rotating cutting-head, and adjustable cams carried by said cylinder and serving to move said cutting-head frame, substantially as and for the purpose set forth.

7. The combination of a main frame, a rotating stock-cylinder, means for clamping a leaf thereto, a yieldingly-held cutting-head frame, an adjustable bracket rigidly secured thereon, and a cutting-head journaled in said bracket, substantially as and for the purpose set forth.

8. The combination of a main frame, a rotating stock-cylinder, means for clamping a leaf thereto, a yieldingly-held cutting-head frame, an adjustable bracket thereon, a second adjustable bracket, and a brush journaled therein, substantially as and for the purpose set forth.

9. The combination of a main frame, a rotating stock-cylinder, means for securing a sheet of stock on the surface thereof, a cam carried by said cylinder, a movable cutting-head frame, a roller journaled therein and in the path of said cam, and a rotary cutting-head, substantially as and for the purpose set forth.

10. The combination of a main frame, a rotary stock-cylinder, a cutting-head frame, a rotary cutting-head, adjustable tension connection between said frames, means for automatically moving the cutting-head frame, and means for manually moving said cutting-head frame, substantially as and for the purpose set forth.

11. In a machine of the character described, the combination of a bed having a surface for receiving sheet material, a rotary non-shearing cutting-head comprising properly-spaced cutters and a circular gage for bearing upon the stock and regulating the depth of cut, means for producing relative motion between the cutting-head and bed to cause the stock to be traversed by the cutting-head, and means for automatically producing relative approaching and retiring movement between the cutting-head and bed whereby ungrooved margins are preserved on the stock, substantially as and for the purpose set forth.

12. In a machine of the character described, the combination of a rotating stock-cylinder, means for securing sheet material thereon, a rotating cutting-head, and means for automatically producing relative approaching and retiring movement between said cylinder and cutting-head whereby the lateral margins of the sheet are permitted to pass intact beneath the cutting-head, substantially as and for the purpose set forth.

13. In a machine of the character described having a moving bed and clamping means for securing the advance ends of sheets of paper thereto, a rotary non-shearing groove-cutting head, comprising an arbor and separately-formed circular saw-toothed cutters and gage-disks thereon, said disks separating said cutters and regulating the depth of the grooves by bearing upon the paper, substantially as described.

HARVEY P. JONES.
HARRY S. JONES.

In presence of—
WM. R. GOULD,
C. L. DAWSON.